United States Patent [19]

Canterino

[11] 4,348,438

[45] Sep. 7, 1982

[54] PROCESS FOR PREPARATION OF IMPROVED SHRINK WRAP

[75] Inventor: Peter J. Canterino, Towaco, N.J.

[73] Assignee: Mobil Oil Corporation, New York, N.Y.

[21] Appl. No.: 221,711

[22] Filed: Dec. 31, 1980

[51] Int. Cl.³ .................... B32B 27/00; B29D 23/10
[52] U.S. Cl. ......................... 428/36; 156/86; 156/229; 156/308.4; 264/22; 264/230; 264/260; 428/910; 428/913; 204/159.2; 156/273.3
[58] Field of Search ................ 264/22, 230, 260; 156/229, 308.4, 272, 86; 428/36, 500; 204/159.2, 159.14

[56] References Cited

U.S. PATENT DOCUMENTS

| | | | |
|---|---|---|---|
| 3,144,398 | 8/1964 | Rainer et al. ........................ | 156/277 |
| 3,144,399 | 8/1964 | Rainer et al. ........................ | 156/272 |
| 3,663,662 | 5/1972 | Golike et al. ..................... | 204/159.2 |
| 3,773,870 | 11/1973 | Spillers ................................ | 264/22 |
| 3,886,056 | 5/1975 | Kitamaru ............................ | 264/22 |
| 3,949,110 | 4/1976 | Nakajima et al. ................... | 264/22 |
| 4,318,763 | 3/1982 | Bieler et al. ......................... | 428/36 |

*Primary Examiner*—George F. Lesmes
*Assistant Examiner*—E. Rollins Buffalow
*Attorney, Agent, or Firm*—Charles A. Huggett; James F. Powers, Jr.; James P. O'Sullivan, Sr.

[57] ABSTRACT

A process is disclosed for preparing a low density polymer shrink wrap which comprises uniaxially cold-orienting and irradiating a film formed from a low density ethylene homopolymer or copolymer, and then forming a wrap by sealing a portion of the film along a seam which runs generally perpendicular to the direction of the orientation.

4 Claims, No Drawings

PROCESS FOR PREPARATION OF IMPROVED SHRINK WRAP

BACKGROUND OF THE INVENTION

1. Field of the Invention

This invention belongs to the field of processes for producing polyethylene film products and, in particular, to the processes for producing improved shrink wrap from polyethylene homopolymers and copolymers.

2. Description of the Prior Art

Low density polymers, i.e., generally considered as those polymers having a density of less than about 0.94 gm/cm$^3$, have been modified by many different post finishing methods in order to achieve certain physical properties which are desirable for some types of products. Low density polymers such as polyethylene homopolymers and copolymers have, for example, been oriented unaxially and/or biaxially in order to gain higher tensile strength and to gain a greater degree of clarity and transparency. Likewise, it is known that irradiation of such polymers causes crosslinking of polymer chains thereby making the resins more "form-stable" and capable of retaining a greater degree of transparency.

Post finishing operations of orienting and irradiating have also been used to produce a polyethylene polymer which has "shrink" energy and is intended for use in the fabrication of containers, closures, squeeze bottles, toys, film packaging materials, flexible bags, etc. For example, U.S. Pat. Nos. 3,144,398, and 3,144,399 disclose, respectively, a process for producing and a shrinkable polyethylene product prepared by cold stretching polyethylene and then irradiating the stretched polyethylene with a dosage of from about $20 \times 10^6$ to about $200 \times 10^6$ rep. (one rep. being defined as that amount of nuclear radiation which dissipates 93 ergs of energy per gram of tissue, i.e., approximately equal to the amount of energy that would be dissipated by a one roentgen X-ray beam in a gram of tissue). While these disclosures are addressed primarily to processes for preparing low density polymer sheet used for forming shaped articles, similar techniques have been considered for use in the preparation of polymer films.

U.S. Pat. No. 3,022,543 describes a method for preparing polyethylene film having, inter alia, a strong biaxial shrinking force and greatly increased tensile strength. The film is prepared by stretching a tube of extruded film in at least one direction while the film is a little above room temperature cooling the "tube" of film, irradiating the film with a dose of at least $2 \times 10^6$ rep. reheating the irradiated tube while in a bath of inert liquid to a temperature of at least 65° C., laterally stretching the tube by the "bubble" method, and stretching the tube, again, longitudinally, at least 100% while in the reheated state followed by cooling the film prior to release of the stretching.

In U.S. Pat. No. 3,663,662 a cross-linked, oriented film of a blend of polymers is described which is both heat-shrinkable and heat-sealable so as to be usable on automated packing equipment. The blend includes about 70% to 85% by weight of a low density polyethylene homopolymer or copolymer having a density of from 0.91 to 0.93 gram/cc at 25° C., the balance of the blend being a high density polyethylene homopolymer or copolymer having a density of 0.94 to 0.98 gram/cc at 25° C. The film formed therefrom is capable of shrinking at least 15% in each direction in the plane of the film at a temperature of 100° C., a shrink tension of at least 200 psi at 100° C. and a zero strength temperature of at least 175° C. in each direction. This film is obtained by forming a self-supporting film of the polymer blend indicated above, heating the film to a temperature of 90° C. to 115° C., stretching the film by a factor of at least five in each of two mutually perpendicular directions in the plane of the sheet, cooling the film under tension, and irradiating the film for a period sufficient of raise the zero strength temperature to 175° C.

The object of each of the foregoing processes can generally be considered as the production of a film having increased overall shrink energy. Higher overall shrink energy, however, may be achieved only at the expense of other desirable goals and properties, e.g., by introducing additional complexity to the process and/or reducing film strength.

SUMMARY OF THE INVENTION

In accordance with the present invention, shrink wrap is prepared by the process which comprises forming a film from low density polyethylene, orienting the film uniaxially at a temperature of at least about 5° C. below the melting point of the polyethylene, irradiating the oriented film with ionizing radiation, forming the film into a wrap of desired size, and sealing the wrap along a seam which runs generally perpendicular to the direction of orientation. While irradiation of the film can be carried out before the orientation step, it is preferred that irradiation be conducted upon an oriented film.

The shrink wrap prepared according to this invention can be shrunk below the melting point of the polyethylene with a consequent saving in energy. In addition, the seal formed in the wrap is highly resistant to rupture upon shrinkage. Furthermore, since the wrap of this invention is only uniaxially cold-stretched, a second biaxial orientation and the reheating steps associated with known procedures are eliminated thereby saving the cost of additional equipment and energy.

A "rad" is a convenient term for expressing radiation dosage or the amount of energy absorbed by a material as a result of exposure to ionizing radiation. One rad is the amount of ionizing radiation absorbed during the deposition of 100 ergs ($10^{-5}$ watt second) of energy in one gram of the material irradiated. A megarad is $10^6$ rads.

The term "polyethylene" as used herein contemplates both homopolymers of ethylene as well as copolymers of this olefin with up to 20 weight percent of one or more other monomers copolymerizable with ethylene.

DETAILED DESCRIPTION OF THE INVENTION

The polyethylene films to which the invention herein is applicable are low density polyethylene (LDPE) films or sheets produced by well-known film-forming techniques, e.g., extrusion, casting and so forth. Such resins can be conventional ethylene homopolymers or copolymers of ethylene with minor amounts of one or more other unsaturated monomers copolymerizable with ethylene. Preferred unsaturated monomers for copolymerization with ethylene comprise acrylic acid, esters of acrylic acid, vinyl acetates or other vinyl esters, and olefinic monomers having from 3 to about 8 carbon atoms. The ethylene content of the copolymer, i.e. that portion attributible to ethylene monomer, will preferably comprise at least about 80% by weight of the copolymer.

The methods employed to form the polymers useful herein are not critical to the success of this invention and will be well known to those skilled in the art. In general, with respect to ethylene homopolymers and copolymers of ethylene with acrylic acid and acrylic or vinyl esters, it has been found preferable to use conventional high pressure and high temperature techniques to carry out the polymerization. When copolymers of ethylene with other olefinic monomers are desired, the well-known low pressure polymerization techniques have been found useful.

The polymeric films or sheets formed of these resins may likewise be produced by conventional means, such as extrusion through a slot die or by casting techniques. The important consideration with regard to the film or sheet material, beyond the ethylene content of the polymer, is that the density thereof be controlled to come within the approximate range of 0.915 to 0.935 g/cm$^3$. Since there is a definite known relationship between the degree of crystallinity and the density of polyethylene, it is convenient to control the density by exercising control over the level of crystallization of the polymer. One method of accomplishing this is to control the molecular structure of the polymer. Since crystallinity in polyethylene is primarily a function of the number of branches along the polymer chain, one may, for instance, introduce more side chains and thereby decrease crystallinity. Or conversely, one may conduct the reaction of the monomers such that relatively fewer branches are formed and thereby produce a polymer which is more crystalline.

The rate of cooling will also effect the crystallinity of extruded or cast films of polyethylene. A film which undergoes very gradual cooling or annealing from the melt will have a relatively higher crystalline content, and hence higher density, than an otherwise identical film which has been rapidly quenched after formation. These relationships and their utilization to manipulate the physical character of polyethylene products are known to those skilled in the art. A more detailed discussion is to be found in the article on Ethylene Polymers in vol. 6 of the *Encyclopedia of Polymer Science And Technology*, N.M. Bikales executive editor, published by Interscience Publishers (John Wiley & Sons, Inc.), the entire contents of which are incorporated herein by reference.

We have found that the low density polyethylene film, as characterized above, either in the form of a continuous web or in discrete sheets, may be stretched in a single direction to derive all of the known and beneficial effects of orientation in that direction without loss of properties, as exemplified by the tear strength, in the transverse direction. Such improvement is desirably accomplished by stretching the film at a temperature below its crystalline melting point and preferably above the glass transition temperature (Tg). The preferred stretching temperatures will fall within the approximate range of 70° C. to about 5° C. below the melting point of the polymer.

The degree of film elongation (stretch) may be from about 50% to about 700% of its original length without significant deterioration of transverse properties. Preferably, while the film is being stretched in one direction (e.g., along its length), the direction at right angles (its "width") is held fixed by mechanical means to prevent necking-down or narrowing of the film.

Stretching a film of this nature in the machine direction below the melting point causes the film to have high shrink energy in the machine direction. However, the shrink forces are such that in shrinking, seals usually fail.

The film oriented in this manner is then subjected to a source of ionizing radiation, e.g., a high energy particle beam such as X-rays, gamma rays, high speed electrons and similar energy sources. The duration of irradiation is not critical, dosages of from about 1 to about 20 megarads, and preferably, from about 3 to about 5 megarads being entirely suitable in most cases.

Following irradiation, the film is formed into an article-encompassing enclosure, such as a sleeve, and sealed along a seam which runs generally perpendicular to the direction of orientation in the plane of the film. For instance, since in most cases, the film will be oriented in the machine direction, the film will be cut in the transverse direction and the seam produced upon formation of the enclosure will also run in the transverse direction. In this way, maximum sheet strength is provided against the stress created by shrinkage of the wrap.

It has been demonstrated experimentally that the wrap produced in this way is capable of adequate shrinkage below the melt point of the polymer film and that the wrap can be shrunk without breakage of the film or rupture of the seal.

EXAMPLES

Two films fabricated from a low density polyethylene (Northern Petro Chemical 963 resin) were evaluated. One film was General Film NPC 963 Resin and the other was General Film—Cold Oriented 2X in the machine direction at approximately 90° C.

Some samples were prepared for testing by irradiation at 1, 3, and 5 megarads with a high energy electron beam. All samples were then sealed in both the machine direction and the transverse direction. The samples were then cut into strips and supported with the seal under tension after which they were placed in an oven at 400° F. for 15 seconds, removed and observed to determine whether the seals broke after the film shrunk. The results are set forth in the table below.

| | Film | SHRINK WRAP TEST RESULTS Direction Seal is Running | Rad. Dose | Pass Rate |
|---|---|---|---|---|
| 1. | General Film NPC-963 Resin No Orientation; No Radiation | M.D. | | 5 passed |
| | | T.D. | | 5 passed |
| 2. | General Film NPC-963 Resin 2X Oriented; No Radiation | M.D. | | 5 passed |
| | | T.D. | | 5 failed |
| 3. | General Film NPC-963 Resin No Orientation; Radiated | M.D. | 1 Mrad | 5 passed |
| | | | 3 Mrad | 5 passed |
| | | | 5 Mrad | 5 passed |
| | | T.D. | 1 Mrad | 5 passed |
| | | | 3 Mrad | 5 passed |

SHRINK WRAP TEST RESULTS -continued

| Film | Direction Seal is Running | Rad. Dose | Pass Rate |
|---|---|---|---|
| 4. General Film NPC-963 Resin 2X Oriented; radiated | M.D. | 5 Mrad | 5 passed |
| | | 1 Mrad | 5 passed |
| | | 3 Mrad | 5 passed |
| | | 5 Mrad | 5 passed |
| | T.D. | 1 Mrad | 5 failed |
| | | 3 Mrad | 2 passed |
| | | 5 Mrad | 5 passed |

M.D. = Machine Direction
T.D. = Transverse Direction

The high pass rate of the unoriented film, samples 1 and 3 above, is indicative of lack of shrink energy in the film. Of primary importance, however, is the fact that samples which had been oriented but not irradiated failed with the seal in the transverse direction, i.e., the direction perpendicular to the machine direction which is the direction of maximum shrinkage. In contrast, the seals and the sheet of the oriented film which had been irradiated with a dose of 3+ megarads provided an increase in strength passing the test twice with a 3 megarad dose and five times with a 5 megarad dose. A shrink wrap formed in this way is economical to produce and highly effective in use.

While there has been described what is believed to be the preferred embodiment of the invention, those skilled in the art will realize that changes and modifications may be made thereto without departing from the spirit of the invention, and it is intended to claim all such changes and modifications as fall within the true scope of the invention.

I claim:

1. A process for preparing a low density polymer shrink wrap which comprises, forming a low density polyethylene film, uniaxially orienting said film at a temperature of between 5° and 70° C. below the melting point of said polymer, irradiating said film with a source of ionizing irradiation, at a dosage of from about 3 to about 15 megarads, forming the film into a sleeve-like article-encompassing enclosure by cutting and sealing said film along a seam which runs generally perpendicular to the direction of said uniaxial orientation in the plane of said film.

2. The process of claim 1 wherein the polymer is a copolymer of ethylene and at least one member of the group consisting of acrylic acid, ester of acrylic acid, vinyl ester and olefinic monomer possessing from 3 to about 8 carbon atoms.

3. The process of claim 1 wherein said dosage comprises 5 megarads.

4. The low density polymer shrink wrap produced by the process of claim 1, 2 or 3.

* * * * *